United States Patent [19]

McCallion

[11] Patent Number: 5,594,977
[45] Date of Patent: Jan. 21, 1997

[54] SMOOTH ROD-GRIPPING APPARATUS

[76] Inventor: James P. McCallion, 23352 Saint Elena, Mission Viejo, Calif. 92691

[21] Appl. No.: 175,731

[22] Filed: Dec. 30, 1993

[51] Int. Cl.$^6$ ..................................... F16G 11/04
[52] U.S. Cl. ................ 24/136 B; 24/115 M; 52/223.13; 403/314
[58] Field of Search ............................. 24/136 R, 136 B, 24/115 M; 425/111; 249/219.1; 403/314; 294/102.1; 52/223.13

[56] References Cited

U.S. PATENT DOCUMENTS

| | | |
|---|---|---|
| 561,758 | 6/1896 | Brewer . |
| 726,070 | 4/1903 | Keen . |
| 877,118 | 1/1908 | Peirce . |
| 1,543,491 | 6/1925 | Beghetti .................. 24/136 R |
| 1,634,422 | 7/1927 | Holmes . |
| 1,655,734 | 1/1928 | McWilliams .............. 24/136 B X |
| 2,075,239 | 3/1937 | Strange . |
| 2,158,302 | 5/1939 | Peirce . |
| 2,171,120 | 8/1939 | Bullard . |
| 2,177,364 | 10/1939 | Fotsch . |
| 2,614,801 | 10/1952 | Mazzei . |
| 2,699,589 | 1/1955 | Redell . |
| 2,896,496 | 7/1959 | Jansen . |
| 2,935,299 | 5/1960 | Jansen . |
| 3,117,485 | 1/1964 | Jansen . |
| 3,139,730 | 7/1964 | Williams . |
| 3,156,418 | 11/1964 | Jablonski . |
| 3,399,434 | 9/1968 | Kelly . |
| 3,501,183 | 3/1970 | Stratienko . |
| 3,614,140 | 10/1971 | Nestor .................. 24/136 B X |
| 3,795,949 | 3/1974 | Shorter ................... 24/115 M |
| 3,910,546 | 10/1975 | Connors . |
| 3,912,406 | 10/1975 | McGrath . |
| 3,965,542 | 6/1976 | Gregory . |
| 4,006,878 | 2/1977 | Dawson et al. . |
| 4,192,215 | 3/1980 | Hymans . |
| 4,192,481 | 3/1980 | Durbin . |
| 4,363,462 | 12/1982 | Wlodkowski et al. . |
| 4,463,481 | 8/1984 | Rastetter et al. . |
| 4,602,902 | 7/1986 | Herb . |
| 5,015,023 | 5/1991 | Hall ...................... 24/136 R X |
| 5,072,981 | 12/1991 | Weaver et al. ............. 294/102.1 |
| 5,127,696 | 7/1992 | Awano et al. ............. 294/102.1 |
| 5,154,558 | 10/1992 | McCallion . |

FOREIGN PATENT DOCUMENTS 682163  2/1965  Italy .

Primary Examiner—James R. Brittain
Attorney, Agent, or Firm—Price, Gess & Ubell

[57] ABSTRACT

An apparatus for gripping a smooth, fiberglass rod, the apparatus comprising a housing, a jaw cluster within the housing, and a force tube for positioning the jaw cluster within the housing. The rod-gripping apparatus includes a first aperture and a second aperture which facilitate passage of a rod through the apparatus. The force tube is mechanically interfitted with the jaw cluster. The jaw cluster comprises a plurality of elongated jaw members which are generally wedge-shaped and complementary to an inner tapered wall of the housing. The jaw cluster, which surrounds the rod, is set to or released from the rod, as desired, in response to a repositioning of the force tube relative to the housing.

19 Claims, 4 Drawing Sheets

SMOOTH ROD-GRIPPING APPARATUS

BACKGROUND OF THE INVENTION

1. Field of the Invention

The present invention relates to a smooth rod-gripping apparatus and, more particularly, to an apparatus including a housing for receiving a smooth rod, a plurality of elongated jaw members within the housing, and a force tube which secures the smooth rod within the housing by wedging the jaw members between the smooth rod and an inner wall of the housing.

In concrete construction, a cementitious material is placed between erected walls, termed formwork, which provide support until the curing process is completed. Tremendous force is often exerted upon the formwork, particularly when large volumes of concrete are placed. Tie-rods, termed formties, are passed through holes drilled in the formwork and secured in position relative to the forms to prevent an outward expansion of the erected forms during the placement and initial hydration, set, of concrete walls.

The formwork typically includes beams, planks, or the like ("wales" and "stiffbacks," as known in the construction trade). A rod-gripping apparatus is used to prevent the formwork from sliding outwardly along the formtie. The formwork, in turn, serves as a guide for the formtie and as a platform against which the rod-gripping apparatus is positioned. The force-distributing construction of the formwork supports the erected walls and prevents outward bulging of the walls while the wet concrete is curing.

Although concrete construction techniques have progressed tremendously in the last 50 years, most form ties have not changed. The use of steel ties is particularly problematic because of the need to avoid rust which can destroy a structure or ruin its appearance. Prior attempts to eliminate structural rusting include either entirely removing the steel rod or breaking the rod back below the surface. The resulting hole is then plugged and patched over with cementitious material. These practices are very labor-intensive and expensive. Unfortunately, the patching often results in an unprofessional finish, or worse, is overlooked, or simply fails to prevent rusting from occurring.

The smooth rod-gripping apparatus disclosed herein is beneficially capable of gripping smooth fiberglass rods, thereby eliminating the problem of structural failure due to steel formtie corrosion. Furthermore, the rod-gripping apparatus, which includes a unique jaw cluster mechanism, does not need to be "preset" to compensate for anticipated slippage as is required with presently-available rod-gripping devices.

2. Description of Related Art

The art of rod-gripping devices is generally cognizant of gripping devices specifically designed for use with threaded rods. Camming mechanisms used to secure a rod within a gripping device are also known. Representative prior art in the field of rod-gripping devices is included below.

U.S. Pat. No. 4,192,481 discloses grippers that are specifically designed for use with a threaded rod, and not a smooth rod. U.S. Pat. No. 2,614,801 discloses a wire-holding and prestressing device.

U.S. Pat. No. 3,910,546 teaches a she-bolt-type gripper device for a concrete wall formed tie rod. U.S. Pat. No. 3,965,542 is similar to the preceding reference, and further adds a latch mechanism.

U.S. patent application Ser. No. 1,634,422 discloses a rod clamp which operates by camming the tabs of opposing grip members within spiralled slots. U.S. Pat. Nos. 2,075,239 and 2,171,120 both teach variations of a tie wire mechanism.

U.S. Pat. No. 2,699,589 discloses a smooth rod clamping device. U.S. Pat. Nos. 2,896,496 and 3,117,485 teach the use of a spring within a shaft clamping mechanism. U.S. Pat. Nos. 4,192,215 and 4,363,462 are additionally cited as of interest.

The need for an improved smooth rod-gripping apparatus for securing formwork to a formtie still exists. When two opposing forms are erected to form a channel into which concrete is placed, they must be held together until the concrete sets. A rod is passed through the formwork which is positioned on the outwardly-facing surfaces of the structure to be constructed. The formwork, through which the rod passes, serves as a base or platform for a rod-gripping device. A problem typical of smooth rod-gripping apparatuses is that slippage occurs, allowing the walls to expand. Various presetting techniques, such as pounding a wedge-shaped object between the gripping device and the formwork, have been utilized in attempts to minimize this slippage. The inclusion of springs in many existing smooth rod-gripping devices contributes to this slippage.

Another problem typically associated with smooth rod-gripping devices is that formties can only be inserted into one end of the device because of the action of various springs which prevent entry of the formtie from either end of the gripping device.

The smooth rod-gripping apparatus disclosed herein effectively secures smooth rods comprised of metallic or nonmetallic (i.e., fiberglass) materials within the apparatus' housing. The apparatus includes a housing and a plurality of gripping members which are wedged between the outside of the rod and the housing's inner wall, thereby securing the rod within the housing. The smooth rod-gripping apparatus is comprised of very few parts and includes no springs.

Since the disclosed smooth rod-gripping apparatus is designed to grip fiberglass and other smooth rods, the above-discussed problem of structural rust is completely eliminated.

The disclosed apparatus additionally includes a release mechanism which allows the rod-gripping apparatus to be slid off the rod after the rod is cut flush with the wall. Hence, the smooth rod-gripping apparatus is reusable. Alternatively, the release mechanism permits the rod-gripping apparatus and the formwork to be slid off the rod, after which the rod may be cut flush with the wall.

Although several formtie clamping devices exist, the art is still without an inexpensive, smooth rod-gripping apparatus which consists of very few parts and no springs, requires no presetting, grips nonmetallic rods, and releases from the rod for reuse.

OBJECTS AND SUMMARY OF THE INVENTION

An object of the present invention is to provide a smooth rod-gripping apparatus for gripping a smooth rod, wherein the apparatus prevents formwork positioned along the rod from sliding outwardly along the rod.

Another object is to provide a gripping apparatus comprising very few mechanical parts, and no springs, thereby eliminating the need to preset the gripping apparatus to minimize slippage.

An additional object is to provide a gripping apparatus which may be released and slid off the rod, thereby making room for a grinding or cutting tool to cut the rod from the side of the hardened concrete wall.

Another object is to provide a smooth rod-gripping device which will allow positive spreading of formwork to desired finished structure dimensions by erecting both sides of the form, passing the rod through respective grippers, and then tightening the grippers, thereby establishing correct structure width.

The apparatus for gripping a smooth rod includes a housing, a plurality of elongated jaw members positioned within the housing, and a force tube mechanically coupled to the jaw members. A first aperture in the housing receives the smooth rod into a chamber within the housing, the rod exiting from a second aperture included in the housing. The housing's chamber is defined by a tapered inner wall which narrows toward the first aperture. When the rod traverses the housing, the plurality of elongated jaw members, which collectively define a jaw cluster, surround the rod and are radially positioned between the rod and the tapered inner wall of the chamber. The force tube fits within the second aperture and is mechanically coupled to each of the elongated jaw members such that advancement of the force tube into the chamber pushes the jaw cluster toward the first aperture, thereby initiating a setting contact between the elongated jaw members and the tapered inner wall securing the rod within the apparatus. The force tube, when withdrawn from the housing, releases the rod within the housing by separating the jaw members from the tapered inner wall and by applying a releasing force to a plurality of ridge members on the jaw cluster; the withdrawal of the force tube pulling the jaw members toward the second aperture.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a smooth rod-gripping apparatus.

Figure 1:
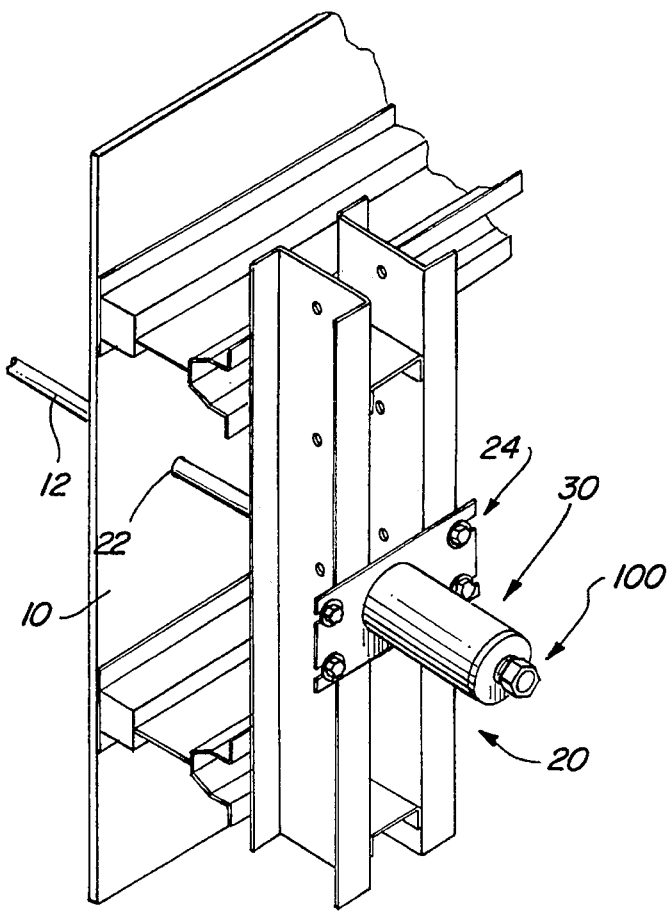
FIG. 1 is a perspective view of a smooth rod-gripping apparatus secured to a rod. The view also shows formwork and a gripper plate which guide the rod as it passes through a wall, the gripper plate further functioning as a platform against which the smooth rod-gripping apparatus is mounted.

FIG. 1 illustrates a first preferred embodiment of a smooth rod-gripping apparatus 30, including a force tube 100, as used with a typical formwork configuration through which a rod 12 perpendicularly passes. The form consists of various types of horizontal and vertical support members 20 attached to sheathing 10, which is typically plywood. A hole 22, through which the rod 12 passes, is provided in the sheathing 10. After the formwork is assembled, the preassembled smooth rod-gripping apparatus 30 and a gripper plate 24 are mounted onto the outermost support member. A rod 12 is passed through the force tube 100, outermost end of the smooth rod-gripping apparatus 30, through the vertical and horizontal support members 20, and through the sheathing 10, via the hole 22. After the smooth rod-gripping device 30 and the plate 24 are properly aligned relative to the axis or centerline to hole 22, the centerline is established by passing the rod 12 through the hole 22. Thereafter, the smooth rod-gripping device 30 and the plate 24 are firmly secured to the outermost support member by a threaded member which passes through open positions provided on the gripper plate 24.

Figure 2:
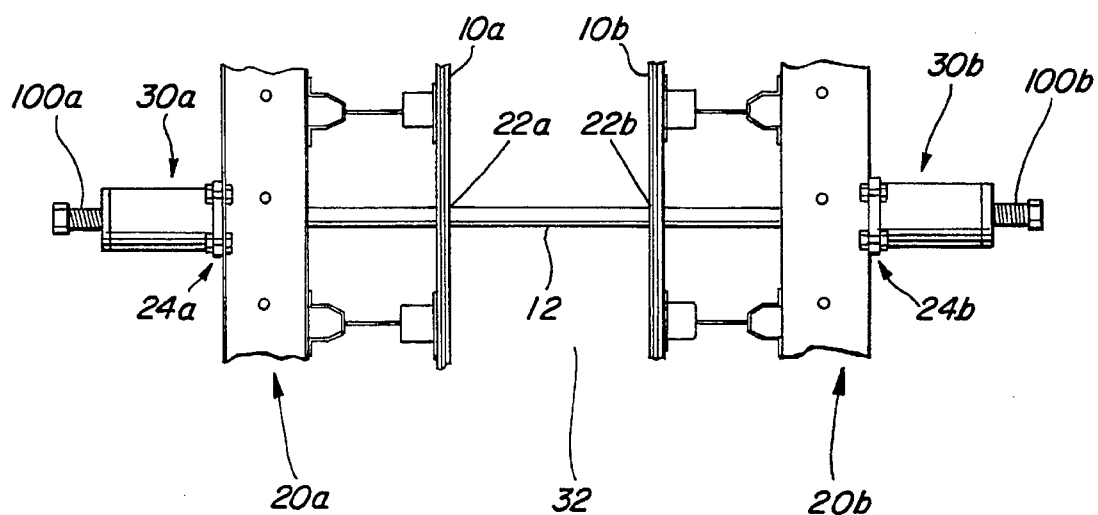
FIG. 2 is a top view of two erected, parallel form walls forming a channel into which a cementitious material is placed and cured. The view shows a rod passing perpendicularly through the two walls, with formwork secured to the rod and abutting the respective outwardly-facing surfaces of both walls, the formwork being respectively secured to the rod by smooth rod-gripping apparatuses attached to opposing ends of the rod.

FIG. 2 is a top view of two assembled formwork panels 10a, 10b and smooth rod-gripping devices 30a, 30b, erected parallel to one another to form a channel 32. This is a typical assembly to those familiar with the construction art, but may vary to accommodate the configuration of the final concrete structure. After the formwork panels have been assembled, as noted for FIG. 1 above, they are erected and aligned to conform to the desired final structure configuration: height, width, length, etc. Rod 12 is sequentially passed through the force tube 100a, the outermost end of the smooth rod-gripping device 30a, the plate 24a, the formwork 10a, 20a, the hole 22a, the channel 32 defined by the formwork, the hole 22b, the formwork 10b, 20b, the plate 24b, the smooth rod-gripping device 30b and, finally, the force tube 100b. The force tubes 100a, 100b on both smooth rod-gripping devices 30a, 30b and plates 24a, 24b are then tightened in such a way as to secure the rod 12 while defining the channel 32 into which wet concrete is to be placed.

It can be readily seen that the rod 12 may be passed through the entire assembly either starting at position 30*a* and ending at position 30*b*, or starting at position 30*b* and ending at position 30*a*. The rod is sufficiently long to provide exposed areas, on opposing ends, to which the smooth rod-gripping apparatuses 30*a*, 30*b* may be secured.

The function of the smooth rod-gripping apparatuses 30*a*, 30*b*, in conjunction with the rod 12 and the formwork 20*a*, 20*b*, is to prevent the sheathing 10*a*, 10*b* from outwardly expanding after a cementitious material has been placed in the channel 32 between the sheathing 10*a*, 10*b*. In other words, the smooth rod-gripping apparatuses 30*a*, 30*b* prevent outwardly-directed forces applied to walls 10*a*, 10*b* by the cementitious material from pushing the formwork 20*a*, 20*b* along the rod 12 toward the smooth rod-gripping apparatuses 30*a*, 30*b*, respectively. The smooth rod-gripping apparatuses 30, 30*b* fix the formwork 20*a*, 20*b* relative to the rod 12, the formwork 20*a*, 20*b* applying and, by virtue of their beamlike structure, evenly distributing inwardly-directed forces across the walls 10*a*, 10*b*.

Figure 3:
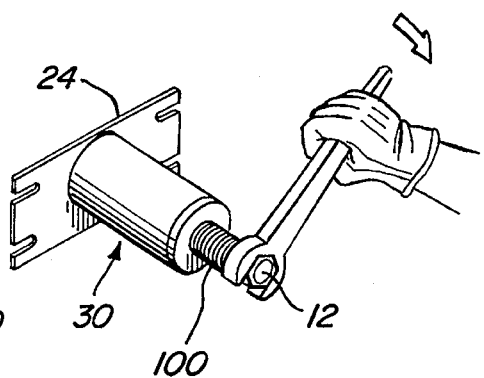
FIG. 3 is a perspective view of a gripper plate and a smooth rod-gripping apparatus being attached to a rod passing through the gripper plate and the smooth rod-gripping apparatus.

FIG. 3 shows the smooth rod-gripping apparatus 30 positioned against a single gripper plate 24. The rod-gripping apparatus 30 is being secured to the rod 12. As will be discussed in greater detail when preferred embodiments of the smooth rod-gripping apparatus 30 are described, the rod-gripping apparatus 30 may be secured to the rod 12 with a twisting motion of the force tube 100 included in the apparatus 30. FIG. 3 is merely illustrative of one method by which the smooth rod-gripping apparatus 30 may be attached to the rod 12, and should in no way serve as a limitation on the scope of the disclosed subject matter. The following is a general description of how the smooth rod-gripping apparatus 30 is used.

The rod-gripping apparatus 30 hereindescribed is compatible with a variety of formwork 20, including all heavy forming systems, steel or aluminum beam-type forms, whether job built or commercially manufactured. Before the smooth rod-gripping devices 30 and plates 24 are bolted to the formwork 20, a rod 12 should be passed through the hole 22 in the sheathing 10 to assure proper alignment. The smooth rod-gripping apparatus 30 and the plate 24, once bolted to the formwork 20, may be left attached to the formwork 20 when the formwork 20 is moved. After verifying that a sufficient length of the rod 12 exists, the rod 12 is passed through the smooth rod-gripping apparatus 30 and the apparatus 30 is secured to the rod 12 by twisting the aforementioned force tube. After the cementitious material has hardened or cured between the erected parallel sheathing 10, a fiberglass rod 12, which will not rust if left within the hardened cement, need only be cut flush with the sheathing 10 by means known to those familiar with the art of construction.

Figure 4:
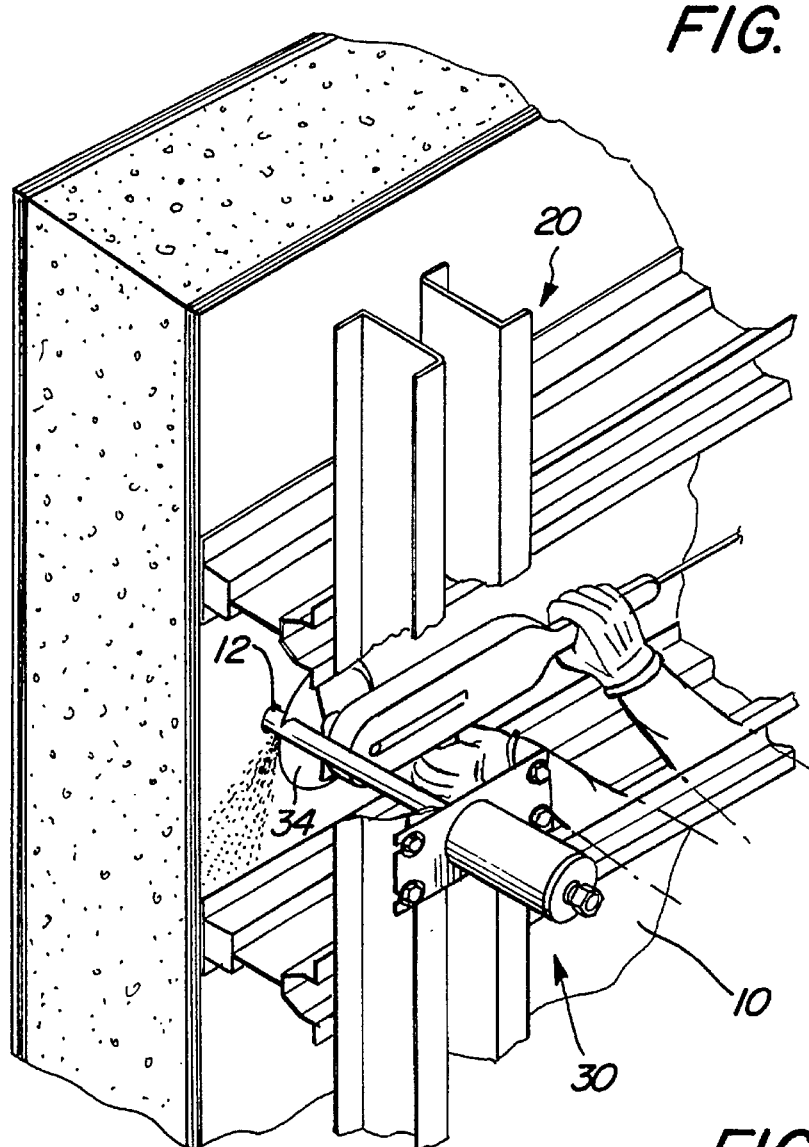
FIG. 4 is a perspective view showing how a circular saw may be used to cut a rod after a cementitious material has hardened between two parallel support walls.

FIG. 4 shows that a circular saw 34 may be used to cut the rod 12 flush to the sheathing 10 while the formwork 20 is still assembled about the rod 12. Better access for the purpose of cutting the rod 12 is possible by first releasing the smooth rod-gripping apparatus 30 from the rod 12 so that the apparatus 30, and then the formwork 20, may be slid off the end of the rod 12.

Figure 5:
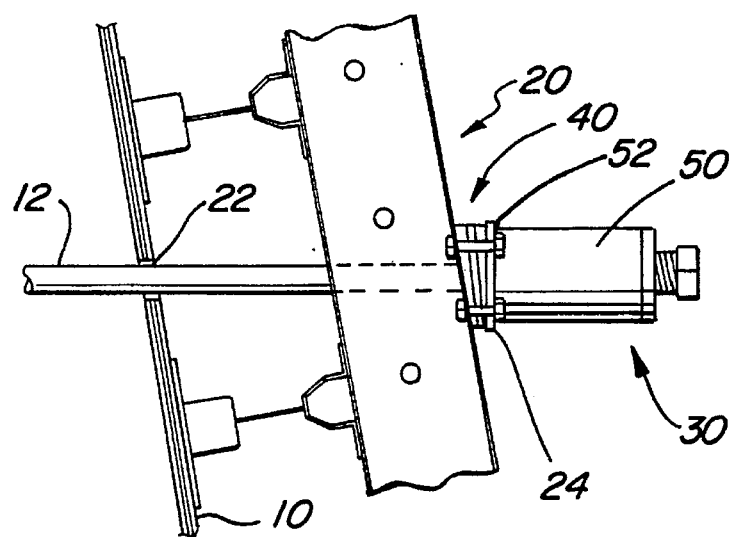
FIG. 5 is a side view of the apparatus of FIG. 1, illustrating a rod emerging from the support wall at an angle which is not perpendicular to the support wall. The view shows that shims may be added between the formwork and the gripper plate so that the gripper plate will provide a platform for the smooth rod-gripping apparatus that is perpendicular to the longitudinal axis of the rod.

FIG. 5 shows a sheathing 10 which does not form a plane perpendicular to the longitudinal axis of the rod 12. The formwork 20 is typically made of steel girders or beams which may not readily be adjusted to compensate for irregularities in the wall or for the misdrilling of the holes 22 within the walls 10. Accordingly, a plurality of shimming wedges 40 may be positioned between the gripper plate 24 and the smooth rod-gripping apparatus 30. The most visible part of the smooth rod-gripping apparatus 30 is its housing 50. Although not illustrated in FIG. 5, the smooth rod-gripping apparatus 30 includes a planar abutment surface 52 which faces and makes contact with either the gripper plate 24 or the shimming wedges 40, if used.

Figure 6:
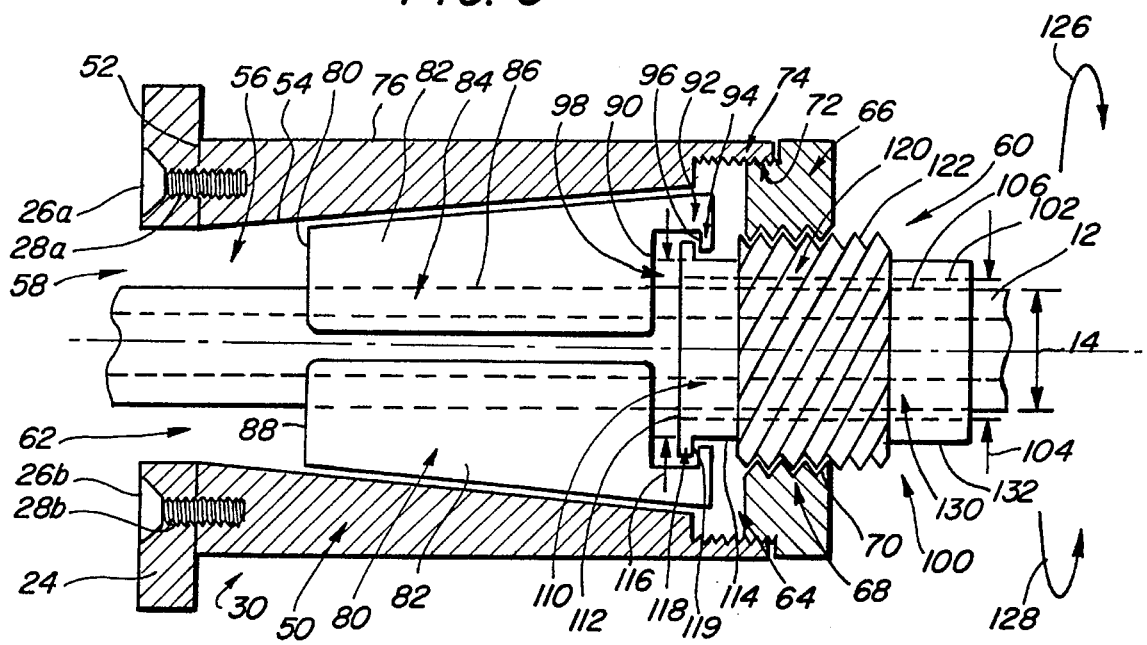
FIG. 6 is a partial cross-sectional side view of a preferred embodiment of the smooth rod-gripping apparatus with a rod passing therethrough.

FIG. 6 shows a preferred embodiment of the smooth rod-gripping apparatus 30 attached to the gripper plate 24, which serves to span the formwork and provide a stable base for the rod-gripping apparatus 30. Preferably, the gripper plate 24 is bolted to the housing 50 with at least two threaded bolts 26*a*, 26*b* which respectively pass through threaded bores 28*a*, 28*b* of the gripper plate 24.

The smooth rod-gripping apparatus 30 includes the housing 50, a jaw cluster 80, and a force tube 100. The rod 12 is characterized by a rod diameter 14 and, thus, the components of the smooth rod-gripping apparatus 30 are necessarily sized so that the rod 12 is able to pass through the housing 50 from either end of the smooth rod-gripping apparatus 30. Accordingly, high-strength rods 12 which may have a large rod diameter 14, require a rod-gripping apparatus 30 appropriately large in size.

The housing 50 includes a tapered inner wall 54 defining a chamber 56 within the housing 50. The chamber 56 is accessible on opposing ends of the housing 50 through a first aperture 58 and a second aperture 60. The chamber 56 increasingly narrows toward a front portion 62 of the chamber 56 which adjoins the first aperture 58. More specifically, the abutment surface 52 carries the first aperture 58. Obviously, the first aperture 58 is sized such that the rod 12 may pass therethrough, as is the second aperture 60.

In the preferred embodiment shown in FIG. 6, the tapered inner wall 54 is conical in shape and increasingly widens toward a rear portion 64 of the chamber 56 adjoining the second aperture 60. The housing 50 includes an end cap portion 66 which carries the second aperture 60. Preferably, the second aperture 60 is a cylindrical bore 68 defined by a helical groove 70. The second aperture 60 is sufficiently large in size to permit the rod 12 to pass therethrough. Preferably, the end cap portion 66 includes a threaded bolt portion 72 sized to screw into a threaded nut portion 74 located near the rear portion 64 of the housing 50. Such an arrangement ensures that the end cap portion 66 is detachable from the housing 50. Other securing mechanisms, as known in the art, may be utilized to detachably secure the end cap portion 66 to the housing 50. The end cap portion 66 may also be an integral part of the housing 50.

The housing 50 also includes an exterior surface 76 spanning from the first aperture 58 to the second aperture 60. More specifically, the exterior surface 76 adjoins the abutment surface 52 at the housing's front portion 62 and the detachable end cap portion 66 at the housing's rear portion 64. The preferred exterior surface 76 is cylindrical in shape and positioned relative to the tapered inner wall 54 such that the exterior surface 76 concentrically circumscribes the tapered inner wall 54. The preferably cylindrical shape of the exterior surface 76 facilitates the machining of the housing 50 from a material such as steel.

FIG. 6 also shows how the jaw cluster 80 fits within the chamber 56 and around the rod 12 passing therethrough. The jaw cluster 80 is comprised of a plurality of elongated jaw members 82, each sized such that the rod 12 may freely enter the chamber 56 through the first aperture 58 and exit the chamber 56 through the second aperture 60 or enter the second aperture 60 and exit the first aperture 58. Each elongated jaw member 82 is generally wedge-shaped. The elongated jaw members 82 are assembled onto the detachable end cap portion 66 and force tube 100 before the resulting assembly is inserted into and secured to the housing 50. Each of the elongated jaw members 82 includes a tapered outer surface 84 which faces the tapered inner wall 54 of the housing 50. The tapered outer surfaces 84 are contoured to permit the elongated jaw members 82 to slide against the tapered inner wall 54. In a preferred embodiment, the jaw cluster 80 comprises three elongated jaw members 82 approximately equal in size.

Each elongated jaw member 82 includes a clasping inner surface 86 facing the rod 12. In a preferred embodiment, the clasping inner surfaces 86 are conformed in shape to match the curvature of the rod 12.

The jaw members 82 also include a front surface 88 facing the first aperture 58. A rear surface 90 of each elongated jaw member 82 includes a counterbore 92 formed thereon. The counterbore or rim 92 effectively extends the tapered outer surface 84 beyond the rear surface 90, thus elongating the jaw member 82. The counterbore 92 includes a cantilevered ridge portion 94 with a ridge surface 96 facing the jaw member's rear surface 90. With the elongated jaw members 82 encircled radially about the rod 12, the counterbores 92 of each jaw member 82 collectively define a circumferential engagement recess 98 within the jaw cluster 80.

Figure 7:
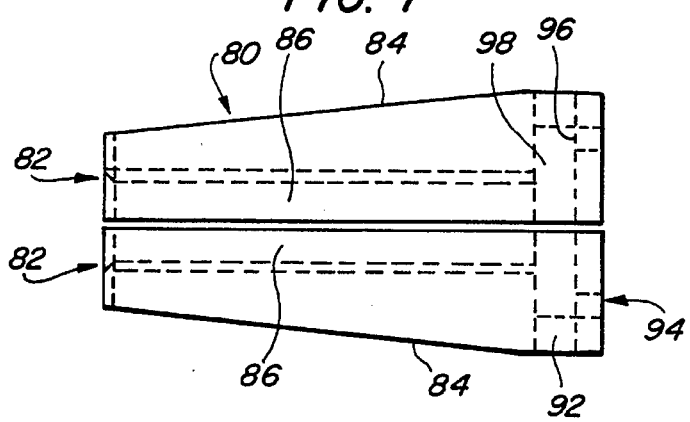
FIG. 7 is a cross-sectional side view of a jaw cluster comprised of three elongated jaw members.
Figure 8:
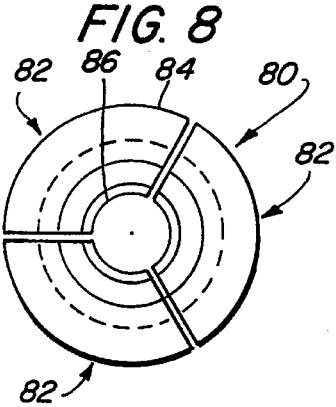
FIG. 8 is an end view of the jaw cluster of FIG. 7.
Figure 9:
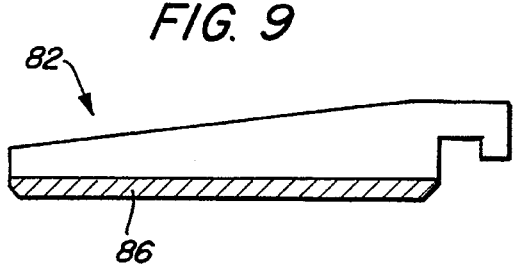
FIG. 9 is a cross-sectional side view of one of the elongated jaw members of the jaw cluster of FIG. 7.

FIG. 7 shows a cross-sectional view of the preferred three-jaw-member jaw cluster 80. The clasping inner surfaces 86 and the engagement recess 98 are visible in this view. FIG. 8 is an end view of the jaw cluster 80 shown in FIG. 7. As may be readily understood, the specific dimensions and surface curvatures defining each of the jaw members 82 may be appropriately varied to accommodate rods 12 of different diameter. FIG. 9 is a cross-sectional side view of a single elongated jaw member 82. The clasping inner surface 86 is a smooth cylindrical surface and need not, but may, include grooves, threads, or other surface irregularities.

Referring back to FIG. 6, the force tube 100 is shown cross-sectionally. The force tube 100 includes a tube inner surface 102 defining a cylindrical conduit 106 through the force tube 100. The cylindrical conduit 106 is characterized by a tube inner diameter 104 which is larger than the rod diameter 14. The force tube 100 includes a stepped portion 110 and a torquer portion 130 on opposing ends of the conduit 106. The force tube 100 also includes a threaded portion 120 between the stepped portion 110 and the torquer portion 130.

The stepped portion 110 includes a thrust surface 112 facing the rear surfaces 90 of the jaw cluster 80. The stepped portion 110 is also defined by a tube outer surface 114 with a tube outer diameter 116, which is sufficiently small to permit insertion of the force tube 100 into the second aperture 60. The thrust surface 112 adjoins the tube inner surface 102 and radially extends outward therefrom, forming an annular extension 118. The annular extension 118 is cantilevered from the tube outer surface 114 when viewing the force tube 100 from its side. Thus, the thrust surface 112 extends beyond the tube outer diameter 114. On the other side of the annular extension 118 is a release surface 119 which adjoins the tube outer surface 114. The following is a description of how the jaw cluster 80 and the force tube 100 are assembled into housing 50 before the detachable end cap portion 66 is secured to the smooth rod-gripping apparatus 30.

The insertion of the elongated jaw members 82 into the chamber 56 (which increasingly narrows from the rear portion 64 toward the front portion 62) necessarily brings the elongated jaw members 82 closer together, accordingly decreasing the diameter of the circumferential engagement recess 98. Before the jaw cluster 80 is inserted into the chamber 56, the annular extension 118 is fitted within the jaw cluster's engagement recess 98 with the thrust surface 112 facing the rear surfaces 90 of the jaw cluster 80, and with the release surface 119 facing the ridge surfaces 96 of the jaw cluster 80. As the jaw cluster 80 is advanced into the chamber 56, the cantilevered ridge portions 94 of the jaw members 82 move radially inward, preventing the annular extension 118 from leaving the engagement recess 98.

FIG. 6 also shows the threaded portion 120 of the force tube 100. The threaded portion 120 has a helical thread 122 which is circumferentially carried or formed about the threaded portion 120. The preferred way to assemble the smooth rod-gripping apparatus 30 is to first thread the force tube 100 into the detachable end cap portion 66 before the end cap portion 66 is attached to the housing 50. Next, the jaw cluster 80 is fitted about the annular extension 118 of the force tube 100. Last, the entire assembly comprising the jaw cluster 80, the force tube 100, and the detachable end cap portion 66 is advanced into the chamber 56; the assembly of the smooth rod-gripping apparatus 30 being completed when the detachable end cap portion 66 is attached to the housing 50.

In view of the above, the threaded portion 120 and its helical thread 122 are sized to permit threading of the force tube 100 into the helical groove 70 of the cylindrical bore 68 defining the second aperture 60. The following is a functional description of how the smooth rod-gripping apparatus 30 secures itself to and releases itself from the rod 12.

The aforedescribed mechanical coupling of the plurality of jaw members 82 to the annular extension 118 is critical in the operation of the smooth rod-gripping apparatus 30. In the preferred embodiment illustrated in FIG. 6, the jaw cluster 80 is wedged between the rod 12 and the tapered inner wall 54 when the jaw cluster 80 is advanced toward the first aperture 58. When the elongated jaw members 82 are bound between the rod 12 and the tapered inner wall 54 as such, the rod 12 is secured into the smooth rod-gripping apparatus 30. When a twisting force 126 is applied to the torquer portion 130, the force tube 100 advances into the housing 50. The twisting force 126 initiates a setting contact between the thrust surface 112 and the rear surfaces 90 of the jaw cluster 80. The setting contact advances the jaw cluster 80 toward the front portion 62 of the housing 50, thereby securing the rod 12 within the apparatus 30 when the tapered outer surfaces 84 make contact with the tapered inner wall 54.

Similarly, a countertwisting force 128, when applied to the torquer portion 130, withdraws the force tube 100 from the housing 50. The countertwisting force 128 separates the thrust surface 112 and the rear surfaces 90 and initiates a releasing contact between the release surface 119 and the ridge surfaces 96. The releasing contact pulls the jaw cluster 80 toward the rear portion 64 of the housing 50, thereby releasing the rod 12 within the apparatus 30 by separating the tapered outer surfaces 84 from the tapered inner wall 54.

In the preferred embodiment shown in FIG. 6, the torquer portion 130 includes a hexagonal nut surface 132 formed therearound. The hexagonal nut surface 132 facilitates the application of either the twisting force 126 or the countertwisting force 128 with a common wrench. Although the detachable end cap portion 66 includes a cylindrical bore 68 with a helical groove 70, other means for advancing the force tube 100 into the chamber 56 and withdrawing the force tube 100 from the same may be implemented by one of ordinary skill in the art.

Figure 10:
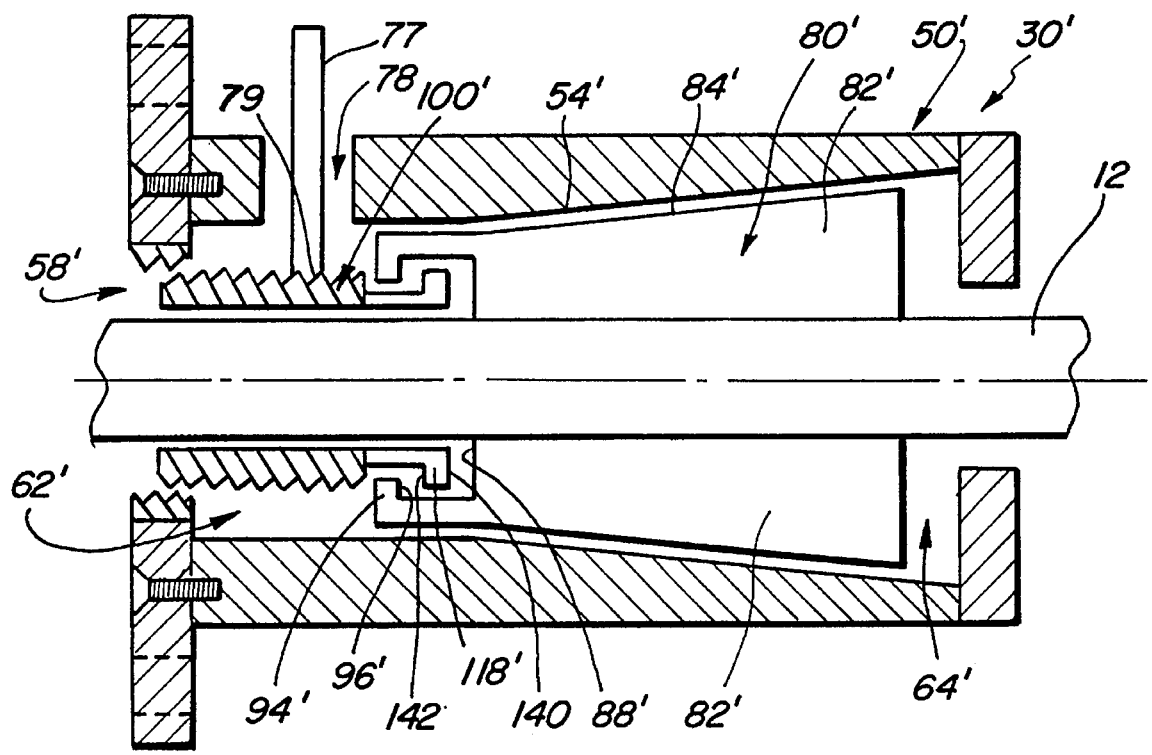
FIG. 10 is a partial cross-sectional side view of an alternative preferred embodiment of the smooth rod-gripping apparatus with a rod passing therethrough.

FIG. 10 shows an alternative preferred embodiment of the smooth rod-gripping apparatus 30'. This alternative embodiment similarly includes a housing 50', a jaw cluster 80', and a force tube 100'. The rod-gripping apparatus 30' is very similar to the first preferred embodiment described, with the exception of several structural differences. First, the force tube 100' is threaded into a first aperture 58' and is rotated within the housing by a handle 77 attached to the force tube 100' and protruding from the housing 50' through a slot 78 formed thereon. The force tube 100' includes a plurality of holes 79 into which the handle 77 is selectively inserted for rotating the force tube 100'. Since the slot 78 cannot extend around the entire housing 50', the plurality of holes 79 permit multiple rotations of the force tube 100' by using each of the plurality of holes 79 to incrementally rotate the force tube 100' as far as the slot 78 permits, and then to continue the rotation of the force tube 100' by moving the handle 77 to a different hole 79.

Figure 11:
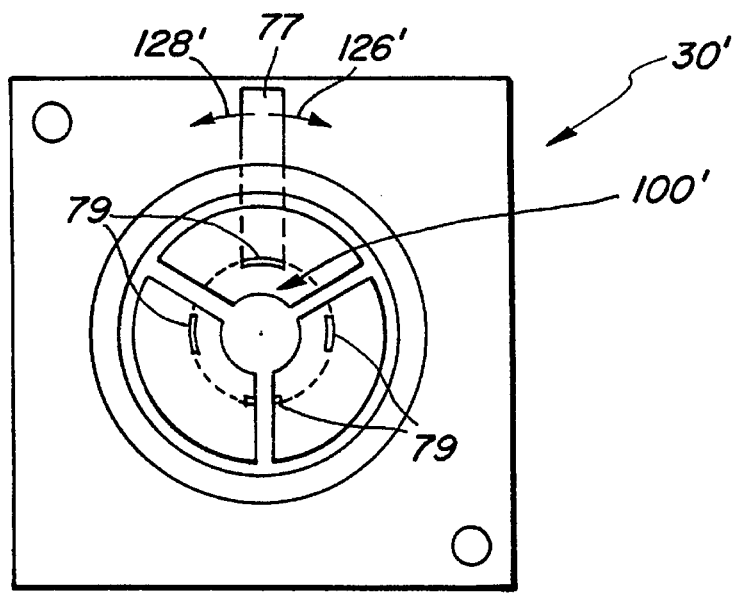
FIG. 11 is a partial cross-sectional end view of the smooth rod-gripping apparatus of FIG. 10.

FIG. 11 illustrates a partial cross-sectional end view of the smooth rod-gripping apparatus 30'. The force tube 100' in this view includes four such holes 79. A twisting force 126', when applied to the handle 77, secures the rod 12 within the housing 50'. A countertwisting force 128' releases the rod 12. The principal difference between the rod-gripping apparatus 30' and the first preferred embodiment described is that the rod 12 is secured within the rod-gripping apparatus 30' by withdrawing the force tube 100' from the housing 50', rather than by advancing the force tube 100' into the same. A more detailed functional description of the smooth rod-gripping apparatus 30' follows.

As seen in FIG. 10, the jaw cluster 80' is wedged between the rod 12 and the tapered inner wall 54' when the jaw cluster 80' is advanced toward the first aperture 58'. When the elongated jaw members 82' are bound between the rod 12 and the tapered inner wall 54' as such, the rod 12 is secured into the smooth rod-gripping apparatus 30'. The annular extension 118' of the force tube 100' includes a push surface 140 facing the front surfaces 88' and a pull surface 142 facing the cantilevered ridge portion 94'.

When the twisting force 126' is applied to the handle 77, the force tube 100' is withdrawn from the housing 50'. The twisting force 126' initiates a setting contact between the pull surface 142 and the ridge surfaces 96' of the jaw cluster 80'. The setting contact pulls the jaw cluster 80' toward the front portion 62' of the housing 50', thereby securing the rod 12 within the apparatus 30' when the tapered outer surfaces 84' make contact with the tapered inner wall 54'.

The countertwisting force 128', when applied to the handle 77, advances the force tube 100' into the housing 50'. The countertwisting force 128' separates the pull surface 142 from the ridge surfaces 96' and initiates a releasing contact between the push surface 140 and the front surfaces 88'. The releasing contact pushes the jaw cluster 80' toward the rear portion 64' of the housing 50', thereby releasing the rod 12 within the apparatus 30' by separating the tapered outer surfaces 84' from the tapered inner wall 54'.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An apparatus for gripping a smooth rod characterized by a rod diameter, the apparatus, when secured to the rod, preventing formwork, fitting about the rod and contacting the apparatus, from sliding along the rod toward the apparatus, the apparatus comprising:

a housing with a tapered inner wall defining a chamber within the housing, the chamber being accessible on opposing ends of the housing through a front aperture and a rear aperture, the tapered inner wall defining the chamber such that the chamber increasingly narrows toward a front portion of the chamber adjoining the front aperture and increasingly widens toward a back portion of the chamber adjoining the rear aperture, the rear aperture being a cylindrical bore with a helical groove, the front aperture, the chamber, and the rear aperture being sized to permit passage of the rod through the housing;

a jaw cluster comprising a plurality of elongated jaw members for securing the rod within the apparatus, the jaw cluster being positioned within the chamber and sized such that the rod may freely enter the chamber through the front aperture and exit the chamber through the rear aperture or likewise enter the rear aperture and exit the front aperture, each of the jaw members including a tapered outer surface facing the tapered inner wall, a clasping inner surface facing the rod, a front end near the front aperture, and a rear end near the rear aperture, the rear end of each jaw member including an arcuate shoulder formed thereon by extending the tapered outer surface and elongating the jaw member, the arcuate shoulder including an inwardly-opening groove, the arcuate shoulder and inwardly-opening groove of each jaw member collectively defining an internal circumferential engagement recess within the jaw cluster; and a force tube with an outer tube surface having an outer tube diameter and a cylindrical conduit therethrough having a conduit diameter larger than the rod diameter, the force tube including:

a rear portion having a mechanical interface for being torqued by a tool;

a front portion including an annular extension cantilevered outwardly beyond the outer tube diameter to define a pushing surface and a pulling surface, the annular extension fitting within the jaw cluster's internal circumferential engagement recess with the pushing surface facing the front end of the jaw cluster and the pulling surface facing the rear end of the jaw cluster; and an intermediate threaded portion having a helical thread carried circumferentially thereabout to permit threading of the force tube into the helical groove of the housing's rear aperture;

wherein the force robe advances into the housing in response to a twisting force applied to the rear portion, the twisting force initiating a pushing contact between the pushing surface of the force robe and the jaw cluster's internal circumferential engagement recess, the pushing contact advancing the jaw cluster toward the front portion of the housing, thereby securing the smooth rod within the apparatus when the tapered outer surfaces of the jaw cluster contact the tapered inner wall of the housing;

wherein the force tube withdraws from the housing in response to a countertwisting force applied to the rear portion, the countertwisting force and initiating a pulling contact between the pulling surface of the force robe and the jaw cluster's internal circumferential engagement recess, the pulling contact pulling the jaw cluster toward the rear portion of the housing, thereby releasing the rod within the apparatus by separating the tapered outer surfaces of the jaw cluster from the tapered inner wall of the housing.

2. The apparatus of claim 1 wherein the housing includes a detachable end cap portion upon which the rear aperture is carried.

3. The apparatus of claim 1 wherein the tapered inner wall of the chamber is conical in shape.

4. The apparatus of claim 1 wherein the tapered outer surfaces of the jaw cluster are contoured to permit the jaw cluster to slide against the tapered inner wall.

5. The apparatus of claim 1 wherein the housing includes an exterior surface concentrically circumscribing the tapered inner wall and spanning from the front aperture to the rear aperture, the exterior surface being cylindrical in shape.

6. The apparatus of claim 1 wherein the housing includes an abutment surface facing the formwork, the abutment surface being planar in shape and carrying the front aperture thereon.

7. The apparatus of claim 6 further comprising a plurality of shimming wedges making contact with and positioned between the abutment surface and the formwork.

8. The apparatus of claim 1 wherein the plurality of elongated jaw members comprise three elongated jaw members.

9. The apparatus of claim 1 wherein the plurality of elongated jaw members are approximately equal in size.

10. The apparatus of claim 1 wherein the rear portion of the force tube includes a hexagonal nut surface formed therearound.

11. An apparatus for gripping a smooth rod, the apparatus, when secured to the rod, preventing formwork, fitting about the rod and contracting the apparatus, from sliding along the rod toward the apparatus, the apparatus comprising:

a housing including a tapered inner wall defining a chamber, and a first aperture and a second aperture on opposing ends of the housing providing access to the chamber, the chamber increasingly narrowing toward the first aperture;

a plurality of elongated jaw members positioned within the chamber permitting the rod to freely pass through the chamber via the first and second apertures or likewise enter the second aperture and exit the first aperture, each jaw member including a front surface facing the first aperture and a rear surface facing the second aperture, each jaw member increasingly narrowing toward the front surface, each front surface including a cantilevered ridge portion; and a force tube fitting within the first aperture and about the rod, the force tube comprising:

a front portion including an annular extension mechanically coupled with the plurality of jaw members via their respective cantilevered ridge portions, the annular extension including a push surface facing the front surfaces and a pull surface facing the cantilevered ridge portions; and a rear portion having a mechanical interface for being torqued by a tool, such that the force tube withdraws from the housing in response to a twisting force applied to the rear portion, and as the force tube withdraws, the pull surface makes a setting contact with the cantilevered ridge portions and pulls the jaw members toward the first aperture until the jaw members are bound between the rod and the inner tapered wall, thereby securing the rod within the apparatus, and the force tube advances into the housing in response to a countertwisting force, which is opposite in direction to the twisting force, applied to the rear portion, and as the force tube advances, the pull surface separates from the cantilevered ridge portions, and the push surface makes a releasing contact with the front surfaces and pushes the jaw members toward the second aperture until the jaw members are separated from the rod, thereby releasing the rod within the apparatus.

12. The apparatus of claim 11 wherein the housing includes a detachable end cap portion upon which the second aperture is carried.

13. The apparatus of claim 11 wherein the tapered inner wall of the chamber is conical in shape.

14. The apparatus of claim 11 wherein each of the elongated jaw members includes a tapered outer surface facing the tapered inner wall of the housing, the tapered outer surfaces being contoured to permit the jaw members to slide against the tapered inner wall.

15. The apparatus of claim 11 wherein the housing includes an exterior surface concentrically circumscribing the tapered inner wall and spanning from the first aperture to the second aperture, the exterior surface being cylindrical in shape.

16. The apparatus of claim 11 wherein the housing includes an abutment surface facing the formwork, the abutment surface being planar in shape and carrying the first aperture thereon.

17. The apparatus of claim 16 further comprising a plurality of shimming wedges making contact with and positioned between the abutment surface and the formwork.

18. The apparatus of claim 11 wherein the plurality of elongated jaw members comprise three elongated jaw members.

19. The apparatus of claim 11 wherein the plurality of elongated jaw members are approximately equal in size.

* * * * *